July 5, 1927.
L. LINWOOD
SCALE
Filed Nov. 5, 1926
1,635,090
2 Sheets-Sheet 1
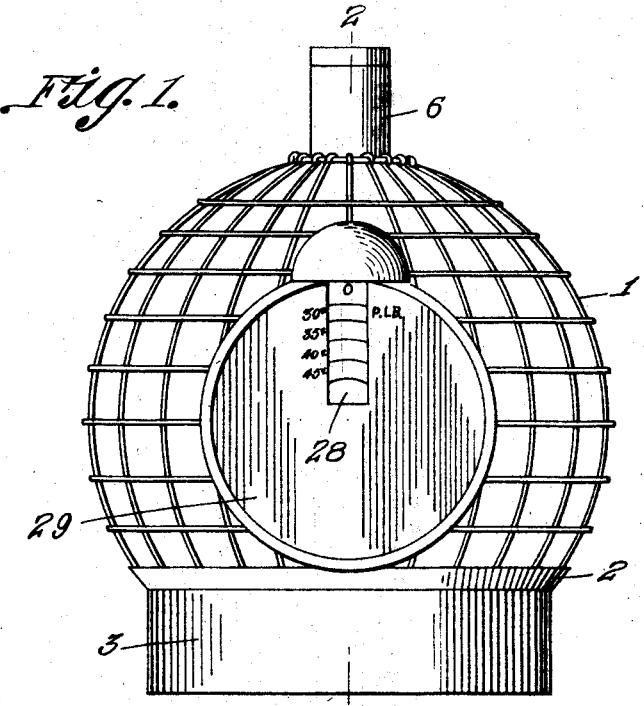
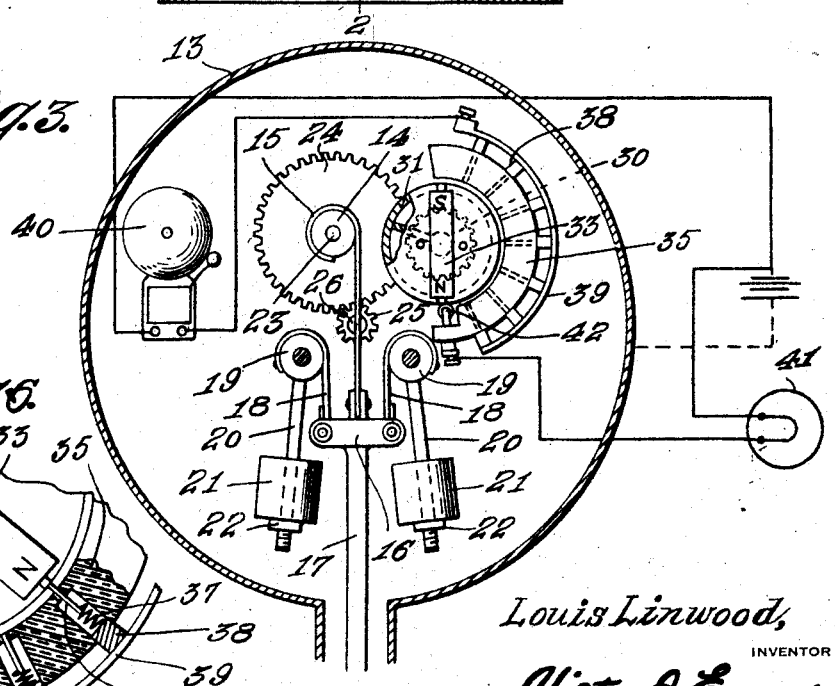
Louis Linwood,
INVENTOR
BY *Victor J. Evans*
ATTORNEY
WITNESS:

July 5, 1927. 1,635,090
L. LINWOOD
SCALE
Filed Nov. 5, 1926 2 Sheets-Sheet 2
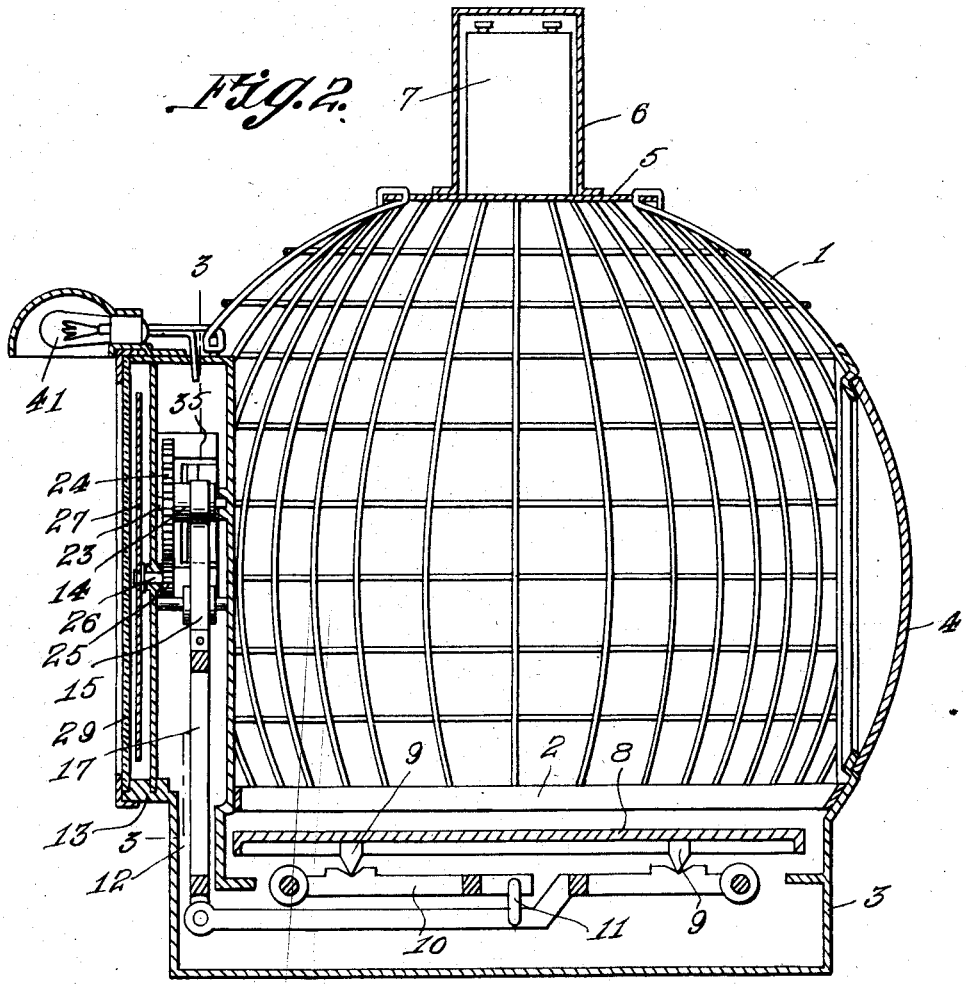
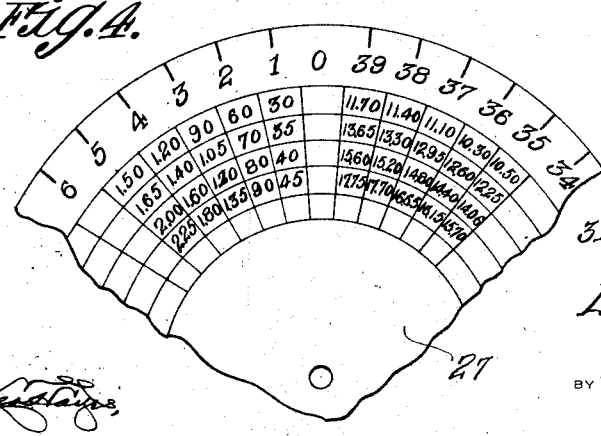
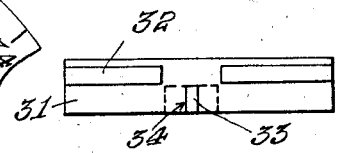
Louis Linwood,
INVENTOR
BY Victor J. Evans
ATTORNEY
WITNESS:

Patented July 5, 1927.

1,635,090

UNITED STATES PATENT OFFICE.

LOUIS LINWOOD, OF SHELBY, MISSISSIPPI.

SCALE.

Application filed November 5, 1926. Serial No. 146,489.

My present invention has reference to a computing scales, primarily designed for weighing fowls.

An object of the invention is the provision of a scale for this purpose that includes a cage-like body in which fowls are arranged to rest upon a platform, the depression of which actuates means for accurately giving the weight of the fowls, computing the selling price of the fowls, sounding an alarm when the disc indicator of the scales has been brought to view and likewise illuminating the indicator so that the figures thereon may be accurately discerned.

To the attainment of the above broadly stated objects and others which will present themselves as the nature of the invention is better understood, the improvement also resides in certain other novel features of construction, combination and operative association of parts, one of a number of satisfactory embodiments of which is disclosed by the accompanying drawings.

In the drawings.

Figure 1 is a front elevation of a scales in accordance with this invention.

Figure 2 is a sectional view approximately on the line 2—2 of Figure 1.

Figure 3 is a sectional view approximately on the line 3—3 of Figure 2.

Figure 4 is a fragmentary elevation of the dial.

Figure 5 is a plan view of the permanent magnet carrying wheel.

Figure 6 is a fragmentary elevation, with parts in section, to illustrate the manner in which the pole of the magnet attracts one of the contacts to complete a circuit to sound the alarm.

As disclosed by the drawings my improvement contemplates the employment of a substantially globular wire cage 1. The open bottom of the cage rests on and is secured to an annular flange 2 on the hollow base 3 of the improvment. The cage is provided with a normally closed door 4, and on the top of the cage there is secured a plate 5 on which rests a housing 6 for a battery 7.

In the hollow base 3, directly below the cage there is a platform 8. This platform has on its under face depending pointed lugs 9 there are received in V-shaped notches in the scale beams 10. The scale beams are loosely connected together, as at 11, and one of the scale beams has an offset portion that extends below the other scale beam so that the end thereof is projected into a vertical passage 12 that establishes a communication between the hollow base 3 and a cylindrical casing 13 that closes one of the sides of the cage 1 and is arranged above the base 3.

In the casing 13 there is journaled a roller 14, and on this roller there is fixed one end of a flexible strap 15. The second end of the strap is fixedly secured to the upper widened end 16 of a rod 17 that is pivoted to the mentioned end of the scale beam 10. The laterally extending end or head 16 of the rod 17 has secured to the ends thereof flexible elements 18, each of which being upwardly directed and trained around and secured on rollers 19 that are journaled in the casing 13. Each roller has a depending arm 20, and on each arm there is arranged the weight 21. Means 22 hold the weights 21 adjustable on the rods 20.

On the shaft 23 for the roller 14 there is fixed a gear 24. This gear is in mesh with a pinion 25. The shaft 26 for the pinion 25 has fixedly secured thereon a dial disc 27. The disc is of the type employed in ordinary computing scales, the same having its outer face, adjacent its periphery inscribed with data to indicate the number of pounds weighted on the scale, and below this series of numerals with the total of the price of the articles dispensed in accordance with the weight thereof and in accordance with the charge per pound of such articles. Between these figures there is a blank space, and this space is brought opposite a sight opening 28 in a disc 29 that closes the open face of the casing 13. The disc 29 has inscribed thereon numerals indicating the selling price per pound of the poultry to be dispensed.

The gear 24 is in mesh with a second gear 30. This gear has its shaft fixed on a hollow wheel 31. The wheel is of insulating material, but, as disclosed by Figure 5 of the drawings, the same has a split metal ring 32 on the periphery thereof. The shaft for the wheel and gear 30 is also secured to a permanent magnet 33, the poles of the magnet passing through suitable openings 34 in the hollow but closed wheel 31.

Fixed in the casing 13 opposite one side of the wheel 31 there is a segmental member 35 of insulating material. This member 35 has pockets therein, the said pockets having arranged therein, but movable therethrough spring influenced contacts 36, the springs 37 for the said contacts being fixed on metal blocks 38 that project through the pockets and contact with a segmental metal or like conductor 39. The conductor 39 is wired to the battery 7 and is also wired to an audible alarm 40, and to a lamp 41. The return wire from the battery 7 is grounded to the casing 13, and the return wire from the lamp 41 is secured to the binding post on which is arranged the wheel contact 42 that travels over the split metal ring 32 on the wheel 31.

Any desired number of fowls are inserted in the cage, and the weight of the fowls will, of course, depress the platform 8. This swings the beams to influence the rod 17, drawing the same downwardly against the influence of the weights 21. Of course, the weights are accurately adjusted and the downward movement of the rod 17 will revolve the shaft 23, turning the dial 27 to bring the weight of the fowls opposite the opening 28 and the selling price of the fowls also opposite the said sight opening. The turning of the shaft 23 influences the wheel 24 to turn the wheel 31, so that when the north pole of the permanent magnet is brought opposite any one of the spring influenced normally housed magnets 27, the said magnet will attract the contact, drawing the same thereagainst to complete the circuit through the spring 37, block 38 and conductor 39, so that the alarm 40 will be sounded each time the magnet moves over the contacts, when the scale reaches an equilibrium. The selling price of the fowls is indicated by the disc 27. Also during the operation of the scales the lamp 41 will be illuminated.

The simplicity of my construction and the advantages thereof will, it is thought, be perfectly apparent and appreciated by those skilled in the art to which such invention relates. As is well known fowls cannot be accurately weighed in the usual manner for the reason that the legs of the fowls must be either tied or held by the operator when the fowl is placed on the scales. With my improvement it is merely necessary to open the door 4 to permit any desired amount of fowls being arranged in the cage 5 and being accurately weighed thereby. After the fowls have been weighed the door is opened and the fowls may find egress therethrough.

The improvement may be cheaply manufactured and marketed. Of course, I do not wish to be restricted to the precise details herein set forth and, therefore, hold myself entitled to such changes therefrom as fairly fall within the scope of what I claim, providing such changes do not depart from the spirit or sacrifice any of the advantages of the invention.

Having described the invention, I claim:—

1. A poultry weighing scales including a cage having a door for the insertion of poultry therein, a platform in the bottom of the cage, beams influenced by the platform, swingable weights influenced by the movement of the beams, a computing dial revoluble by the movement of the weights, electrically actuated means influenced by the dial when the latter is at rest and the platform is depressed for sounding an alarm and for likewise flashing a lamp.

2. A computing scales for weighing fowls including a cage having a normally closed opening, a hollow base supporting the cage, a platform in the base, pivotally supported scale beams engaging the platform, a bar pivoted to the end of one of the beams, a casing in which the bar is received, oppositely disposed pivotally supported adjustable weights flexibly connected with the bar and influenced thereby when the platform is depressed, a computing dial having a shaft, flexible means between the shaft and the bar for turning the dial when the platform is depressed, a hollow insulator wheel actuated by the turning of the dial, a permanent magnet therein having its poles extending therethrough, a segmental insulator battery surrounding the wheel, spaced spring influenced contacts pocketed therein and connected with the segmental conductor and said conductor being wired to a source of electricity including a battery and an alarm.

3. A computing scales for weighing fowls including a cage having a normally closed opening, a hollow base supporting the cage, a platform in the base, pivotally supported scale beams engaging the platform, a bar pivoted to the end of one of the beams, a casing in which the bar is received, oppositely disposed pivotally supported adjustable weights flexibly connected with the bar and influenced thereby when the platform is depressed, a computing dial having a shaft, flexible means between the shaft and the bar for turning the dial when the platform is depressed, a hollow insulator wheel actuated by the turning of the dial, a permanent magnet therein having its poles extending therethrough, a segmental insulator battery surrounding the wheel, spaced spring influenced contacts pocketed therein and connected with the segmental conductor, said wheel having a peripheral split metal rim, a roller contact supported by the segmental member and normally engaging the rim, and said segmental conductor and last mentioned contact being in a source of electricity which includes a battery, an alarm and a lamp.

In testimony whereof I affix my signature.

LOUIS LINWOOD.